Figure 5:
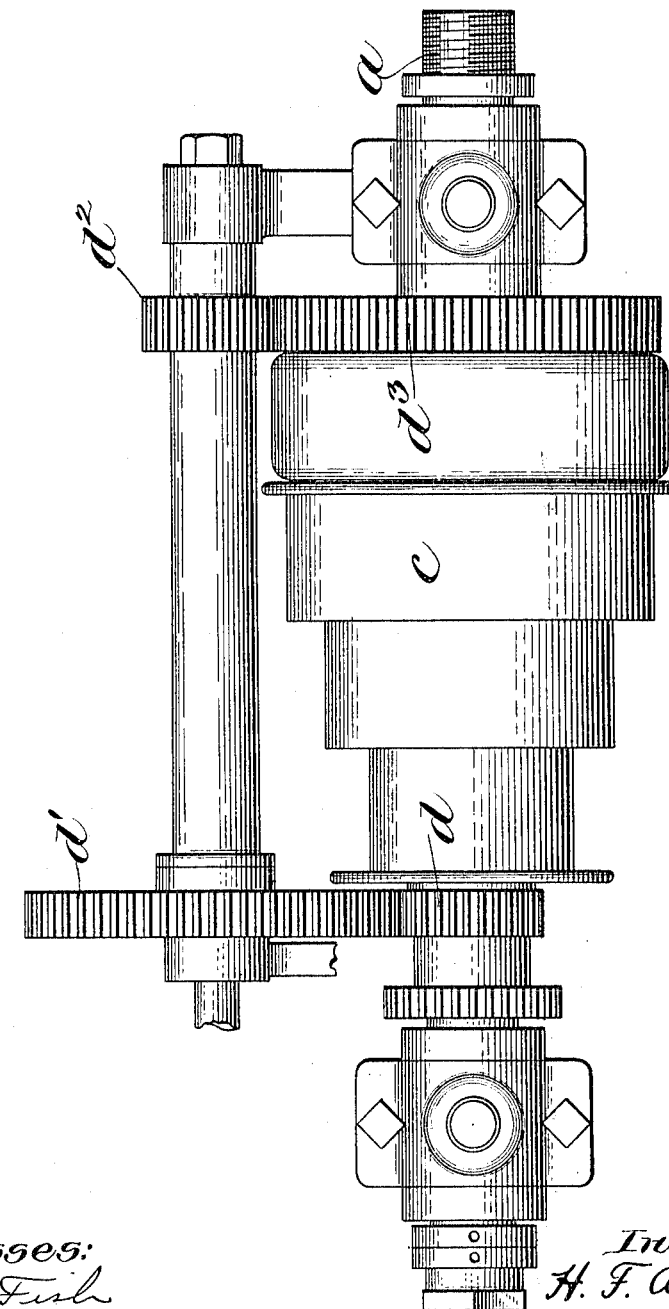

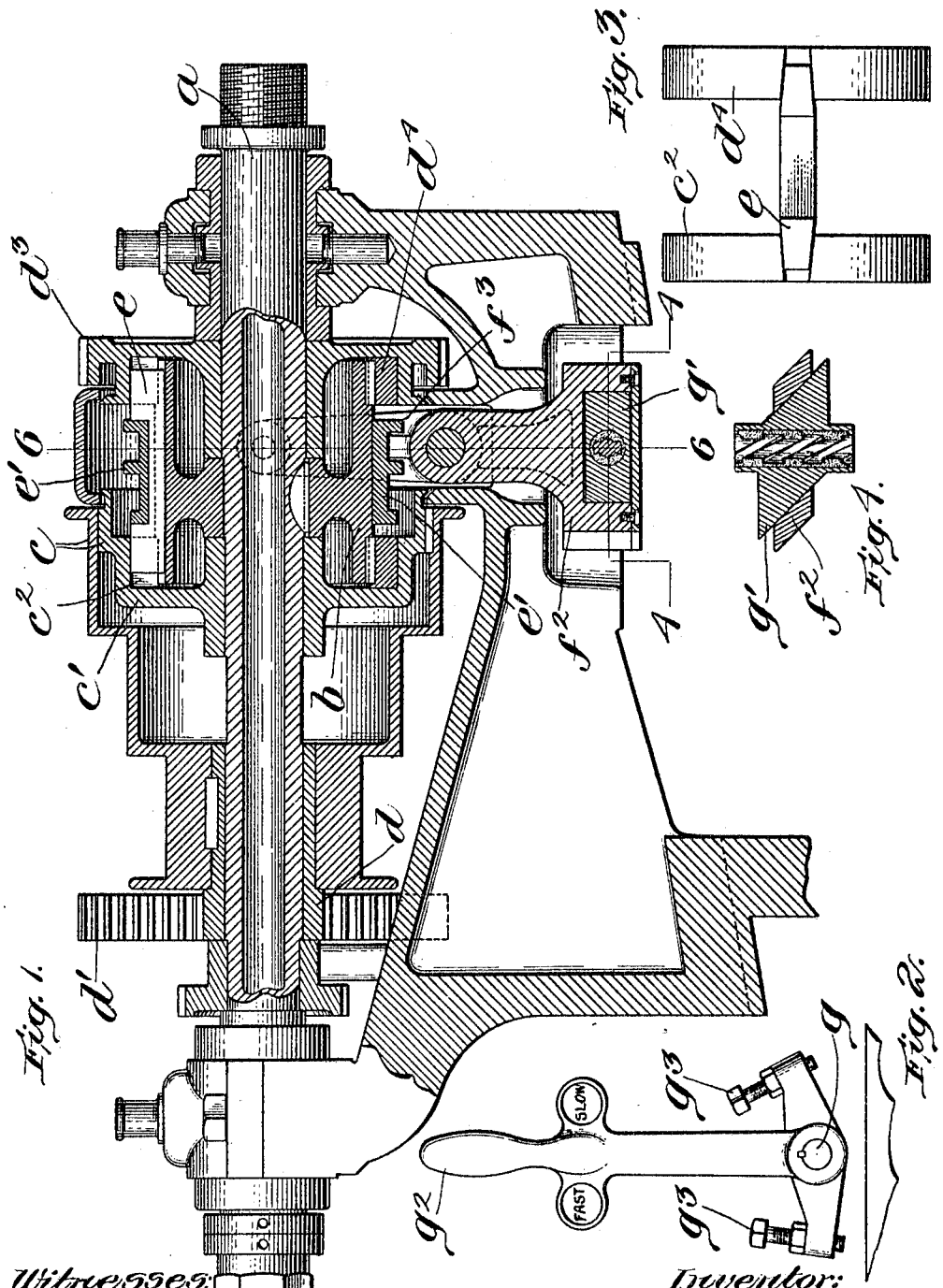

H. F. ARNOLD.
CLUTCH MECHANISM.
APPLICATION FILED JUNE 17, 1905.
1,119,385.
Patented Dec. 1, 1914.
3 SHEETS—SHEET 3.
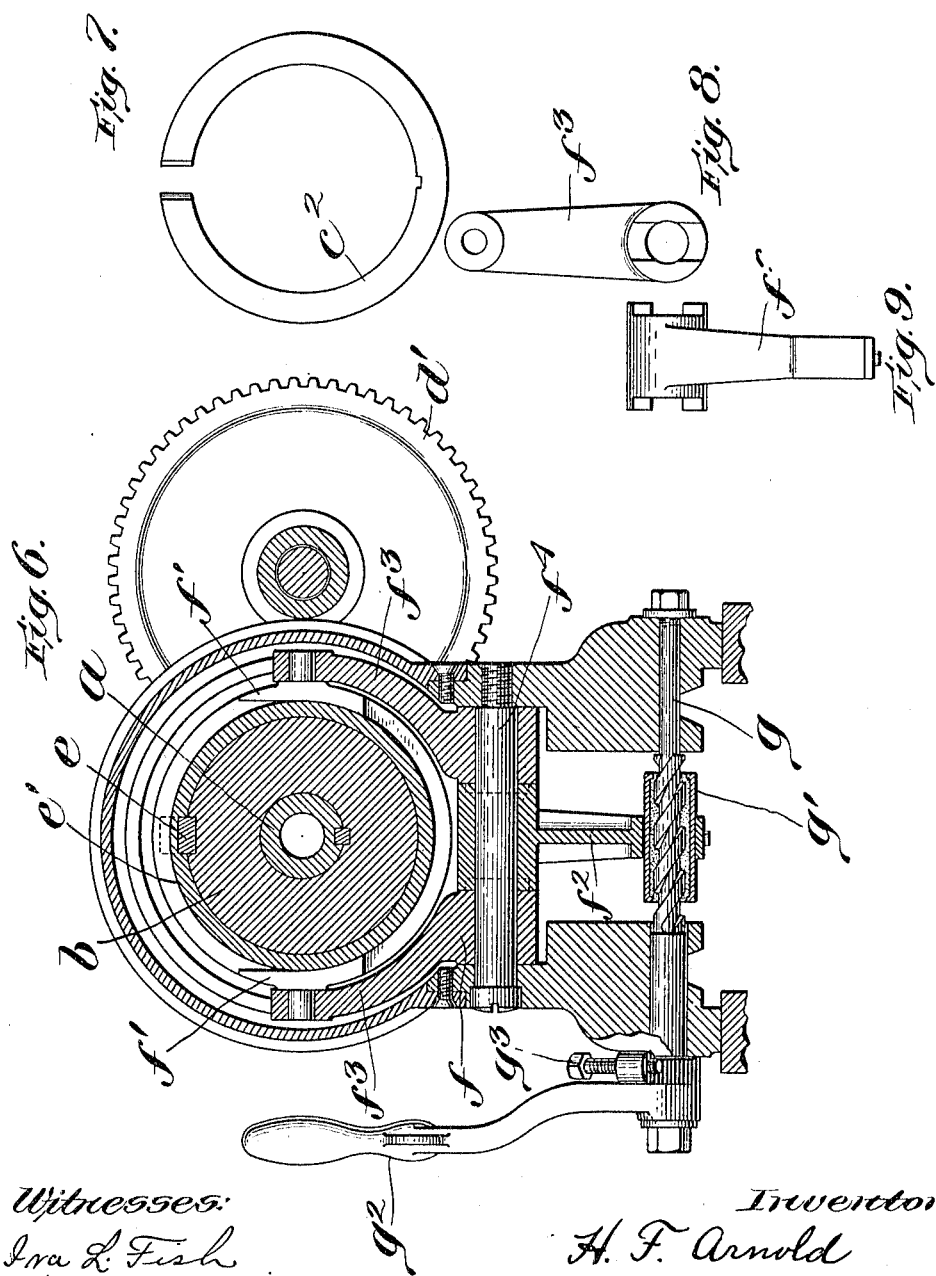
Witnesses:
Ira L. Fish
Katherine A. Dugan
Inventor:
H. F. Arnold
by Geo. N. Goddard
Attorney.

UNITED STATES PATENT OFFICE.

HENRY F. ARNOLD, OF HYDE PARK, MASSACHUSETTS, ASSIGNOR TO AMERICAN TOOL & MACHINE COMPANY, OF BOSTON, MASSACHUSETTS, A CORPORATION OF MASSACHUSETTS.

CLUTCH MECHANISM.

1,119,385.  Specification of Letters Patent.  Patented Dec. 1, 1914.

Application filed June 17, 1905. Serial No. 265,804.

*To all whom it may concern:*

Be it known that I, HENRY F. ARNOLD, citizen of the United States, and resident of Hyde Park, county of Norfolk, Massachusetts, have invented certain new and useful Improvements in Clutch Mechanism, of which the following is a specification.

This invention relates to clutch mechanism for lathes or other machines and has particular reference to the mechanism by which the spindle is driven, the object being to provide a conveniently operated and reliable mechanism by which the speed of rotation of the spindle is changed.

The nature of the invention will be clearly explained in the following specification and its novel characteristics will be defined in the claims hereto appended.

In the accompanying drawings I have illustrated one of the forms of embodying the aforesaid invention.

Figure 1 is a vertical longitudinal section taken through the head of the lathe and the driving mechanism; Fig. 2 is a detail view of the shifting lever with its adjustable stops; Fig. 3 is a detail view illustrating the expanding mechanism; Fig. 4 is a horizontal section on the plane indicated by broken line 4—4 of Fig. 1; Fig. 5 is a plan view of the driving mechanism as arranged in the lathe head; Fig. 6 is a cross sectional view on the plane indicated by 6—6 in Fig. 1; Fig. 7 is a detail view of one of the expansible rings; Figs. 8 and 9 are detail views of parts of the pivoted yoke.

In the practice of my invention the spindle $a$ of the lathe is mounted in the usual way in suitable bearing boxes formed in the lathe head. Keyed fast to the spindle $a$ is an annular head or hub $b$ which is arranged intermediate the cone or step pulley $c$ and the loose gear $d^3$ which is the last gear of the back gearing train $d$, $d'$, $d^2$, $d^3$.

The function of this head or hub $b$ is to form a connection between the spindle to which it is secured and the cone pulley $c$ or the loose gear $d^3$ according as it is desired to drive said spindle directly from the cone pulley or indirectly through the train of back gearing. In order therefore to effect a coupling of either of these members with said hub $b$, I provide expansible members which in this case consist of the split rings $c^2$ $d^4$ which are shown in the drawings as keyed to the hub $b$ so as to rotate therewith, the rings being arranged inside of the cone pulley $c$ and the gear $d^3$ respectively in such position that when the rings are expanded they will form a frictional engagement with the inside surrounding faces of the cone pulley $c$ and the loose gear $d^3$. The hub and rings together form a coupling member connected to and rotating with the spindle.

It will be observed that the cone pulley $c$ is formed with an inside member $c'$ with which the split ring $c^2$ engages and that this member $c'$ is itself keyed to the outer cone of the pulley so as to make the parts to all intents and purposes but one part as they are fastened together and can rotate loosely about the spindle $a$.

Any suitable means may be employed for expanding the split rings into frictional engagement with their respective driving members and in this case I have shown for that purpose a double ended wedge bar $e$ seated in a longitudinal groove formed in the hub $b$ so as to slide axially thereof. The wedge member $e$ is provided with a transverse groove in which rests an annular collar $e'$ which is formed with a peripheral groove or channel in which rest bearing shoes $f'$ connected to the upper portions of the pivoted yoke $f$ so that the movement to and fro of the upper ends of the yoke lengthwise of the spindle transmits a longitudinal or axial movement to the collar $e'$ through the medium of said brake shoes $f'$.

For convenience in assembling, the yoke $f$ is made in three interlocking parts $f^2$ and $f^3$ which are held together by means of the pivot pin $f^4$ which is passed transversely through the head of the lathe and forms the axis upon which the yoke is made to oscillate or swing. The arms $f^2$, $f^3$ are provided with interlocking lugs as shown in Figs. 8 and 9 so as to make them move as one piece.

In order to impart the necessary pivotal movement to the yoke $f$, I provide a screw-threaded rock shaft $g$ which has screw-threaded engagement with a rhomboidal cam block $g'$ which fits into a recess formed in the lower end of the arm $f^2$ as shown in horizontal section in Fig. 4 of the drawings. The lower extension $f^2$ of the yoke $f$ is in effect a fork arranged astride of this cam block so that the travel of the cam block transversely of the lathe in one direction, tends to swing the arm $f^2$ toward the right, while its travel in the reverse direction tends to swing the arm $f^2$ toward the left.

For actuating the rock shaft $g$ I provide an actuating lever $g^2$. To avoid the tendency of the thread of the rock shaft to become jammed too tightly in the cam block $g'$, I provide adjustable stops $g^3$ arranged to abut against the bed of the lathe when the lever is swung to either side. These adjustable stops are shown as consisting of set screws which can be readily adjusted to permit the proper amount of movement necessary to throw the wedge far enough to expand either split ring against its opposing member, while preventing the operator from throwing it so far as to cause the mechanism to stick or bind or cause undue wear of the parts.

The operation of the device will be readily understood from the foregoing description. If it is desired to couple the loose pulley $c$ directly with the spindle for a fast drive, the lever is thrown to the left, thereby causing the wedge member $e$ to travel axially toward the left and to expand the adjacent ring $c^2$ into frictional engagement with the inside face of the portion $c'$ of the loose pulley. The motion of the loose pulley is thus imparted through the wedge member and the hub $b$ directly to the spindle. In case it is desired to drive the spindle through the back gearing, the shifting lever $g^2$ is thrown to the right, which causes the wedge member $e$ to slide in the same direction and thereby expand the split ring $d^4$ against the opposing face of the gear $d^3$. As the back gearing is in constant mesh, the gear $d^3$ which is normally loose on the spindle is constantly rotating and when it is thus coupled rigidly to the hub and spindle, its motion will be transmitted thereto in order to drive the spindle at a lower rate of speed than by means of the direct drive.

By a mechanism constructed upon the principle above described the change from direct to back gearing drive, is accomplished without any liability of breakage and with a minimum degree of shock, while binding of the parts and undue wear is avoided.

Without attempting to set forth all the changes in form, construction and arrangement that may be made in the practice of my invention, what I claim is:—

1. A clutch mechanism for a lathe or the like embracing in combination, a rotatable spindle, rotary driving members loosely mounted thereon, a coupling member adapted to form a driving connection between said rotary members and said spindle, a pivoted yoke for actuating said coupling member to form such engagement, a cam block engaging said yoke to actuate it, a screw threaded shaft engaging said cam block to cause the same to move to and fro, said shaft being provided with an actuating lever, substantially as described.

2. A clutch mechanism embracing in combination, a rotatable spindle, driving members loosely mounted thereon, a coupling member for operatively connecting the spindle with either of said driving members at will, a yoke for shifting said coupling member, a rock-shaft, a cam block arranged to travel to and fro along said rock-shaft as it is moved in either direction, said cam block having operative engagement with the yoke to actuate the same, and means for oscillating said rock-shaft, substantially as described.

3. A clutch mechanism embracing in its construction, a rotatable spindle, alternate driving members loosely mounted thereon, a coupling member secured to the spindle intermediate of the said driving members in position to engage either of said driving members to operatively connect them with the spindle, a movable yoke, a cam block for actuating said yoke, a threaded rock-shaft for actuating said cam block, and a lever secured to said rock-shaft, said lever being provided with adjustable stops to limit its movement in either direction, substantially as described.

4. The combination of a rotatable spindle, a step pulley loosely mounted thereon, an internal supporting spider $c'$ secured to said pulley, a loose gear also mounted upon said spindle, an intermediate hub fixed to the spindle between said spider and said gear with its periphery overhanging the central hubs of the spider and the gear, expansion rings carried by the fixed hub at its opposite extremities to engage respectively the spider and the gear when expanded, a wedge member mounted to slide on the hub in an axial direction to engage the free ends of the respective expansion rings, and means for actuating said wedge in either direction to expand the respective rings into clutching engagement with the spider and gear member, substantially as described.

In witness whereof, I have hereunto set my hand.

HENRY F. ARNOLD.

In the presence of—
M. H. BARKER,
H. W. WOODWORTH.